United States Patent
Steinbrecher

(10) Patent No.: US 10,001,542 B1
(45) Date of Patent: Jun. 19, 2018

(54) METHOD FOR ESTABLISHING DIRECTION OF ARRIVAL BY USE OF SIGNALS OF OPPORTUNITY

(71) Applicant: Donald H Steinbrecher, Brookline, MA (US)

(72) Inventor: Donald H Steinbrecher, Brookline, MA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days. days.

(21) Appl. No.: 15/688,932

(22) Filed: Aug. 29, 2017

(51) Int. Cl.
*G01S 13/08* (2006.01)
*G01S 3/32* (2006.01)
*G01S 3/74* (2006.01)
*H01Q 21/06* (2006.01)
*H01Q 3/26* (2006.01)

(52) U.S. Cl.
CPC ........ *G01S 3/32* (2013.01); *G01S 3/74* (2013.01); *H01Q 3/2682* (2013.01); *H01Q 21/06* (2013.01)

(58) Field of Classification Search
CPC ....................................... G01S 3/32; G01S 3/74
USPC ................................ 342/56, 139, 147, 153
See application file for complete search history.

(56) References Cited

U.S. PATENT DOCUMENTS

| | | | | |
|---|---|---|---|---|
| 6,104,346 A | * | 8/2000 | Rudish | G01S 3/04 342/156 |
| 8,149,156 B1 | * | 4/2012 | Allred | G01S 13/583 342/146 |
| 2005/0012657 A1 | * | 1/2005 | Mohan | G01S 7/025 342/133 |
| 2007/0219742 A1 | * | 9/2007 | Workman | G01N 29/0618 702/150 |
| 2016/0033632 A1 | * | 2/2016 | Searcy | G01S 7/03 342/153 |

* cited by examiner

*Primary Examiner* — Marcus E Windrich
(74) *Attorney, Agent, or Firm* — James M. Kasischke; Michael P. Stanley

(57) ABSTRACT

A method is provided for use of a segmented aperture communications system to determine a direction of arrival of a radio signal in which the system includes a receiver plane having equally spaced and planar aligned radio frequency ports. Computation of the aperture segments depends on the port coordinates where the geometric relationship of the segments is used to determine a time delay and direction of arrival of the signal. The ports receive at least two orthogonal polarizations that characterize the incoming signals. A central port is used as reference to determine a phase difference associated at each port. Two angles are calculated by a simultaneous solution of two phase difference measurements to determine the direction of arrival solution. A mean direction of arrival solution is obtained by averaging solution estimates that are obtained by repeating the direction of arrival determination using random port pairs.

4 Claims, 10 Drawing Sheets

METHOD FOR ESTABLISHING DIRECTION OF ARRIVAL BY USE OF SIGNALS OF OPPORTUNITY

STATEMENT OF GOVERNMENT INTEREST

The invention described herein may be manufactured and used by or for the Government of the United States of America for governmental purposes without the payment of any royalties thereon or therefor.

CROSS REFERENCE TO OTHER PATENT APPLICATIONS

None.

BACKGROUND OF THE INVENTION

(1) Field of the Invention

The present invention is a method for simultaneously receiving propagating electromagnetic signals to illuminate a surface of equal segmented area apertures with each aperture terminating in a radio frequency port coupled to a transmission line. An illuminated port phase center begins a signal path where a digital image is created of an ensemble power of signals captured by one aperture. The digital images of multiple apertures are processed with the locations of the phase centers in order to determine the relative direction of arrival of each signal in the ensemble.

(2) Description of the Prior Art

In the field of signal acquisition systems, there is a need for wideband multifunction digital systems. To address this need, U.S. Pat. Nos. 6,466,167 and 7,250,920 to Steinbrecher disclose segmenting an air interface of a communications system. The communication system improves the signal dynamic range of receiving signals in proportion to the number of aperture segments of the interface and thereby enables a wideband operation.

Each aperture segment in the Steinbrecher references has a radio frequency signal port with a well-defined phase center where the received radio frequency signals are combined in an ensemble so that the relative time domain properties of the signals become fixed as the ensemble is amplified and converted into a digital replica. The digital replica is processed relative to the signal ensembles arriving at other radio frequency port phase centers in the segmented array.

More specifically, Steinbrecher (U.S. Pat. No. 6,466,167) discloses an antenna apparatus with an array of independent radio frequency capture elements with each capture element having a radio frequency port that has a phase center with a known location relative to the other phase centers in the segmented array.

In operation, an observable signal may be inserted into each signal path at a known location relative to each signal path phase center. If present, the observable signal is summed with the signal ensemble received by each radio frequency port in the partitioned array as though the observable signal was injected at the phase center of the radio frequency port. Any signal of opportunity in the field of view with an independently known direction of arrival may be used as the observable signal.

SUMMARY OF THE INVENTION

Accordingly, it is a general purpose and primary object of the present invention to provide a method for estimating the relative direction of arrival of radio frequency signals.

It is a further purpose of the present invention to provide a method that uses a signal ensemble with an observable signal as a signal that is coupled into each radio frequency signal path in order to provide a phase reference for each radio frequency signal in the ensemble with the amplitude and phase at each signal path phase center remaining fixed over time.

It is a still further purpose of the present invention to provide a method that addresses a signal ensemble which includes a plurality of signals that are large and small in amplitude and in which the direction of arrival of the signals in the ensemble are determined relative to each other or relative to the locally generated observable signal.

The method of the present invention is based on a statistical model of a partitioned aperture communications receiving system and specifically a receiving system to converge on a best estimate of the relative direction of arrival for each signal in an ensemble of signals that are in a field of view of the receiving system. A typical partitioned aperture has a hundred equally spaced partition elements arranged in a square pattern resulting in seventy-two equally spaced vertically polarized radio frequency port phase centers and seventy-two equally spaced horizontally polarized radio frequency port phase centers.

The direction of arrival of a signal is specified by two determinable and independent angles and is estimated by using any group of four radio frequency port phase centers in the partitioned aperture. It should be noted that equal spacing of the radio frequency port phase centers is convenient but not essential to the direction of arrival determination which is described herein.

If each determination is made by selecting one radio frequency port phase center from each of the four quadrants, then the number of independent determinations is over one hundred thousand. The determinations are statistically averaged for an expected direction of arrival with a standard deviation of approximately three percent. Statistical averaging improves the accuracy of the relative direction of arrival for two or more signals in the ensembles.

Each radio frequency ensemble is uniquely time dependent because each radio frequency signal arrives at the partitioned array of phase centers from a direction which may be continuously changing. Each signal in each ensemble arriving at a phase center is time shifted by an amount that depends on the direction of arrival of that signal. It is this arrival characteristic that allows a determination of an instantaneous direction of arrival for each signal in the ensemble.

Each partitioned aperture segment collects samples of the incident radio frequency signals to form an ensemble of the signals that collectively arrives at a phase center, passes travel through a common signal path and is digitized by an analog-to-digital converter (ADC). The analog-to-digital converter sampling process that locks the relative time features of the digital signal processing steps are closely correlated with the relative time features of the ensemble signals at the phase center of the aperture segment where the ensemble is formed.

Since the relative time features determine the direction of arrival when at least four phase center signal ensembles and corresponding signal paths are co-processed, the accuracy of the direction of arrival determination is directly related to the size and physical positions of the phase centers associated with each aperture partition. Continuous calibration reduces or eliminates time-varying errors unique to each signal path so that the corrected time and phase information can be converted to a direction of arrival for each signal regardless of a signal-to-noise ratio; provided that the minimum signal intensity exceeds the minimum detectable signal for the signal path. The threshold minimum detectable signal for a signal path is defined as kTFB in which "k" is Boltzman's constant, "T" is 290 Kelvin temperature, "F" is the system noise figure and "B" is the bandwidth of the signal of interest.

A calibration signal of opportunity (CSOO) is used as a reference in the determination of the direction of arrival of another member of the signal ensemble under analysis. The CSOO may be any in-band signal of opportunity with a known direction of arrival that enters the phase center of each partition channel with all other signals of interest in the signal ensemble. The calibration signal of opportunity passes through each signal path to the analog-to-digital converter, thereby terminating the analog portion of each signal path.

The electromagnetic energy of each signal is incident on the partitioned air interface is partitioned into a plurality of approximately equal-power components, each of which is directed to a single RF port where the electromagnetic energy is captured. As described herein, a partitioned air interface is a plane with a capture area called an 'Eplane'. The partition elements divide the Eplane capture area into a plurality of small capture areas called 'Epixels'. If an Eplane with capture area AA is partitioned into N Epixels, each with a capture area XX, then AA is approximately equal to N times XX.

As explained in U.S. Pat. No. 6,466,167, the electromagnetic energy captured by each Epixel is resolved into two polarization vector components according to the polarization of the incident radiation. The two polarization vector components are aligned with the orientation of the Eplane and the power associated with each vector component is directed to an independent RF port phase center. It follows that the number of RF ports, each of which has an independent phase center, is two-times the number of Epixels in the Eplane.

The independent radio frequency signal components are combined at each RF-port phase center to create a composite radio frequency signal that travels through the remaining signal path and is sampled by the ADC. The ADC sampling process locks the relative time properties of the individual signals components arriving at each RF Port phase center so that further digital signal processing observes the relative time properties of the signals as though the observation was occurring at the radio frequency port phase center.

It therefore follows that the relative phase and time relationship between the CSOO and other signals of interest is fixed in time at the phase center of each signal path. If the direction of arrival of the CSOO is known, then the relative time of arrival of the CSOO at each phase center is computable and can be used to calibrate each signal path in the partitioned aperture signal acquisition system. For a partitioned aperture, the relative time of arrival of an incident signal at a plurality of phase centers can be geometrically calculated given the signal relative to the physical locations of the phase centers.

The method of the present invention determines the digital domain direction of arrival of a CSOO by statistically sampling the phase differences among the plurality of signal paths in the digital domain. The relative time difference of arrival at a plurality of phase centers provides the information necessary to determine the direction of arrival of a specific emitter signal.

It is assumed that the radio frequency port phase centers of a partitioned aperture are positioned on a flat plane or a well-defined curved surface such as a cylinder or a sphere. While the method described herein may be implemented on any surface, only flat-plane architecture is described in detail. Thus, it is assumed herein that the radio frequency port phase centers are located on a uniform planar grid defined by X and Y coordinates with dimensional variations that are less than a tenth of a wavelength at the highest frequency of interest. A wave vector, also known as a 'Poynting vector', that defines the direction of arrival of a signal is specified by angles, $\theta$ (Theta) and $\varphi$ (Phi), which are defined in accordance with the partitioned aperture X-Y plane. As used herein, Theta is measured increasing clockwise from the negative X axis and Phi is the elevation angle of the wave vector relative to the X-Y plane.

When the two angles specifying a wave vector and the wavelength are known, the relative time difference of arrival (RTDOA) for that wave vector can be calculated for each phase center in an X-Y plane and the calculated RTDOA values can then be used to calibrate the partitioned aperture.

A wave vector, or Poynting vector, is associated with each signal in the signal ensemble illuminating each RF-port phase center in the segmented array. The wave vector, or Poynting vector, defines the direction of propagation, and therefore the direction of arrival of the electromagnetic signal at each RF-port phase center in the segmented array.

Using the language of the referenced patents, a "segment" is the same as an Epixel. A segmented array can also be defined as an array of segments wherein each segment is an Epixel with two RF ports, each of which has a well-defined phase center having planar X-Y coordinates accurate to a tenth of a wavelength at the highest frequency of interest. For each signal in the ensemble, the wave vector is defined by the two angles (theta and phi) that define the direction of arrival for that signal. For each wave vector, the angles that define the direction of arrival are assumed to be identical at each RF port phase center in the array of RF port phase centers.

Each wave vector has unique temporal features that may be defined in terms of a phase or differential group delay. These temporal features of the wave vector arrive at different times at each RF-port phase center. The critical parameter of the temporal features of a signal of interest is the time difference of arrival (TDOA) computed for each pair of the RF port phase centers in the array of segments. The TDOA of each temporal feature at each pair of RF port phase centers is determined by means of a digital signal processing algorithm. A center-frequency is determined and assigned to the signal-of-interest generating the temporal feature.

The TDOA is then converted to an equivalent phase angle at the center frequency. It is this plurality of phase angles that is used in the algorithm (described herein) that determines the direction of arrival of the signal of interest generating the TDOA. It is these time differences that contain the information needed to determine the direction of arrival for each wave vector.

For example, consider a case in which two signals are incident on a planar array of aperture segments—each of which has two RF ports and each RF port has one phase center. In operation, a first wave vector and a second wave vector simultaneously enter the multiple phase centers. Each aperture segment is an Epixel with two RF ports, each of which has one phase center. After entering each phase center, the two signals generated by the first and second wave vectors travel through the same signal path. After passing through the phase center, the signals experience identical time. It follows that the two wave vectors then have a fixed temporal relationship relative to each other so that if the direction of arrival of either of the two vectors is known, then the direction of arrival of the other vector can be determined.

When the electronic signals generated by the first and second wave vectors are sampled by an analog-to-digital converter terminating the analog signal path, their relative time domain signal properties are set by the sampling process. Their absolute signal properties may be peculiar to the traversed signal path and their direction of arrival as the electronic signals enter the partitioned aperture.

As such, the direction of arrival of the second wave vector is locked to the direction of arrival of the first wave vector at each phase center of the partitioned aperture. The same is true of the other incident wave vectors. Therefore, one incident wave vector can act as the calibration signal for the other incident wave vectors.

BRIEF DESCRIPTION OF THE DRAWINGS

Other objects, features and advantages of the present invention will be better understood by means of a detailed description of the drawings that illustrate the principals of the present invention in which.

DETAILED DESCRIPTION OF THE INVENTION

Figure 1:
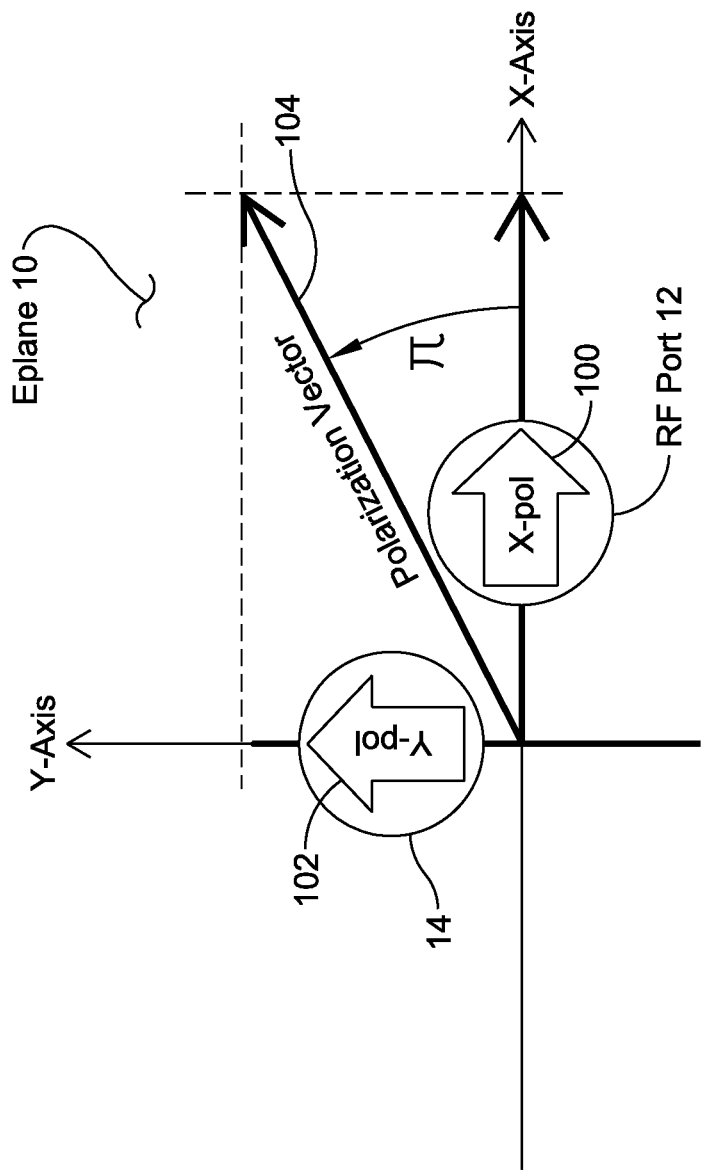
FIG. 1 depicts a resolution of a polarization vector of each incident signal into two orthogonal component vectors that align respectively with an X-axis and Y-axis.

Referring now to the drawings, and more particularly to FIG. 1, each propagating signal incident on an Eplane 10 has a unique instantaneous polarization vector that is time dependent. An instantaneous angle of polarization fl is measured clockwise from a positive X-axis of the Eplane 10 with the angle of polarization resolved into two instantaneous orthogonal polarization components. A first orthogonal polarization component 100 is aligned with the X-axis and a second orthogonal polarization component 102 is aligned with the Y-axis. The first component 100 and the second component 102 of a polarization vector 104 are captured by independent sets of radio frequency ports. The first component 100 is captured by a set of X-polarization radio frequency ports 12 and the second component 102 is captured by a set of Y-polarization radio frequency ports 14. When the first component 100 and the second component 102 are resolved by processing a plurality of the radio frequency ports 12 and 14; each resolved set will yield a direction of arrival solution for the incident radio frequency signal and an instantaneous value of the radio frequency signal polarization vector.

Figure 2:
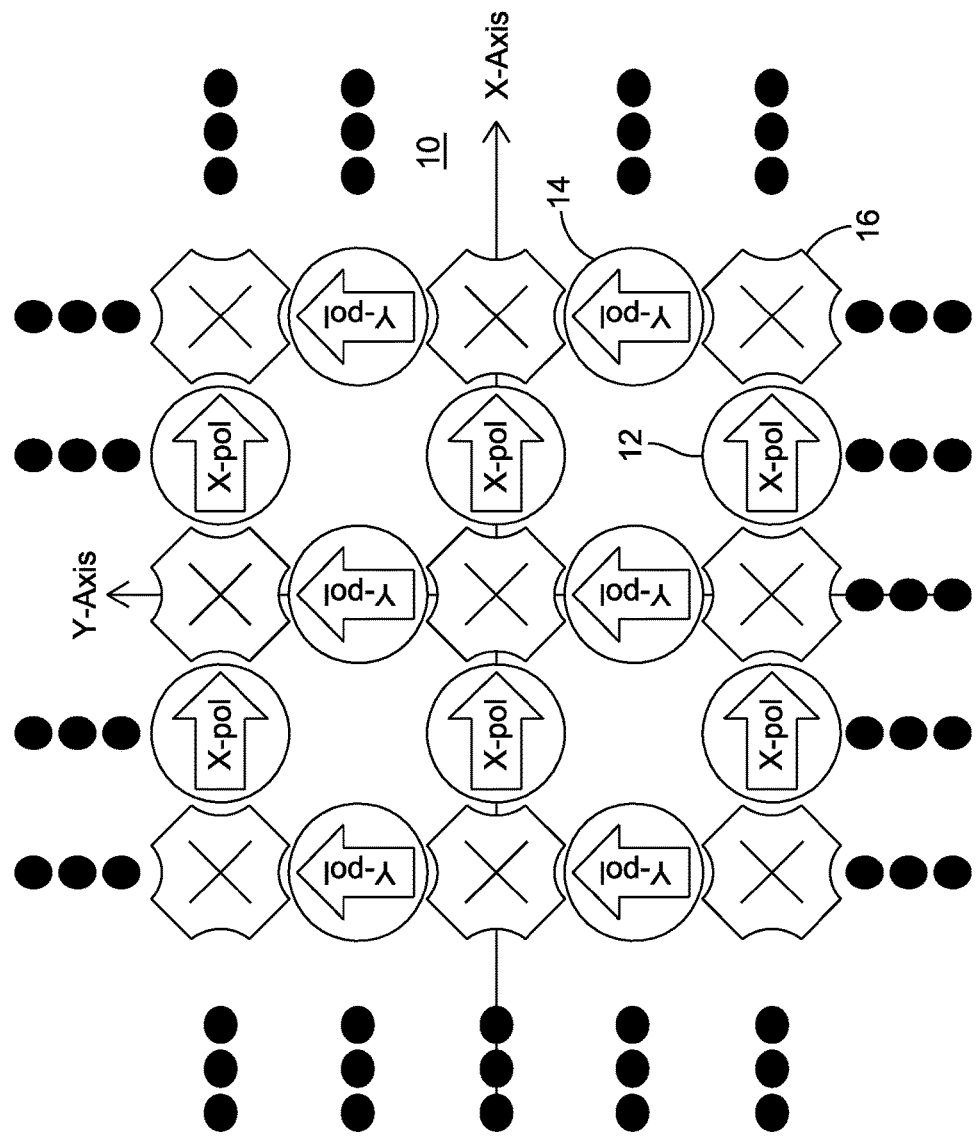
FIG. 2 depicts a physical relationship among partition elements and radio frequency ports that capture X and Y components of a signal polarization vector.

FIG. 2 depicts the organization of the Eplane 10 in which partition elements 16 are designed to resolve radio frequency signal polarization into orthogonal components and also to partition the Eplane into small apertures, each of which is terminated into two RF ports. One RF port 16 is partitioned to capture RF energy aligned with the X-axis. The polarization vector component captured by this RF port is designated the X-pol or the first orthogonal polarization component 100. A second RF port 16 is partitioned to capture RF energy aligned with the Y-axis. The polarization vector component captured by this RF port is designated the Y-pol or the second orthogonal polarization component 102. The RF ports 16 capture the scalar magnitude of the vector components with the first polarization component 100 processed separately from the second polarization component 102.

Figure 3:
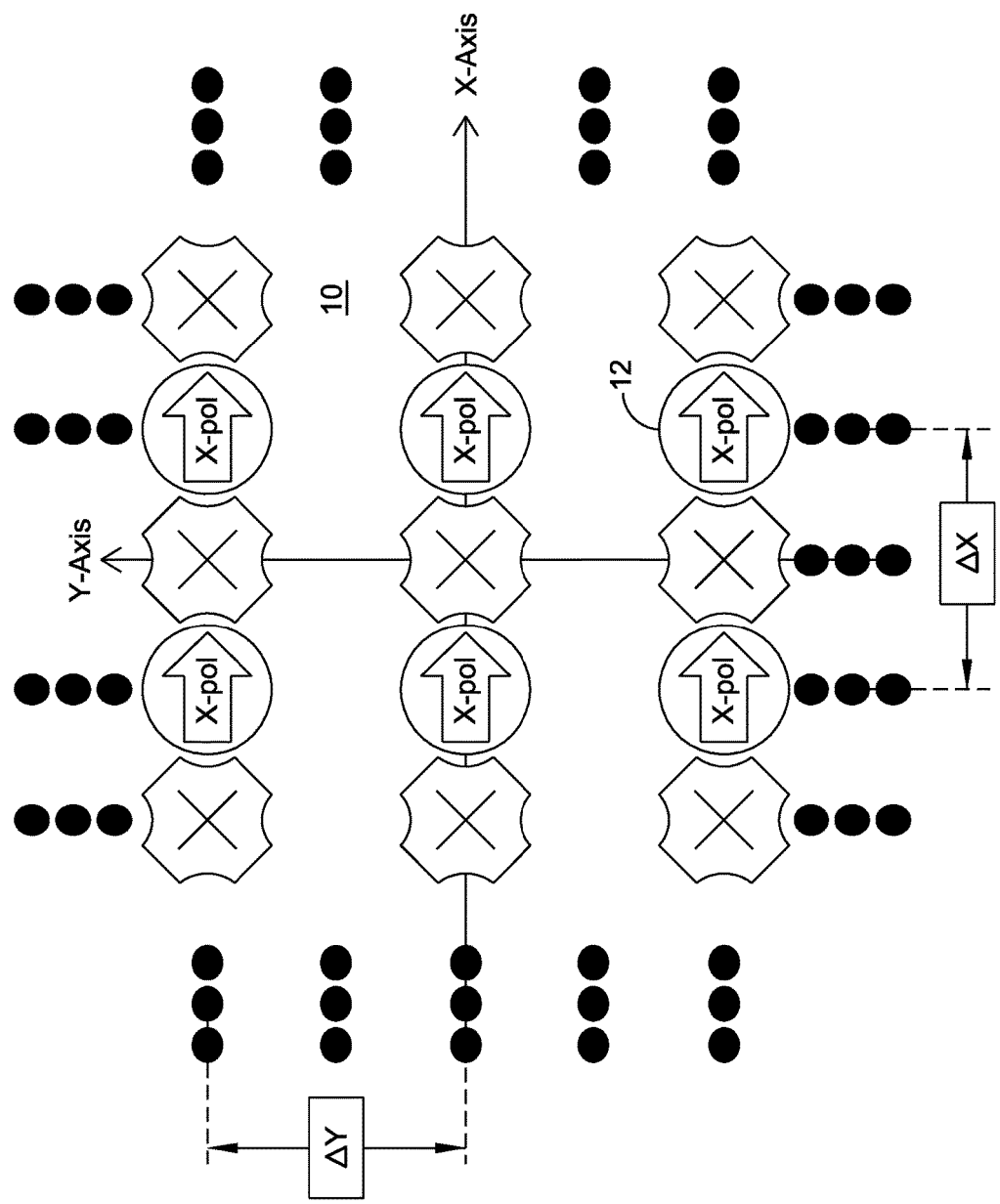
FIG. 3 depicts signal polarization components captured by the radio frequency ports that are aligned with the X-axis and are digitally processed to resolve an instantaneous X-component of each signal polarization.
Figure 4:
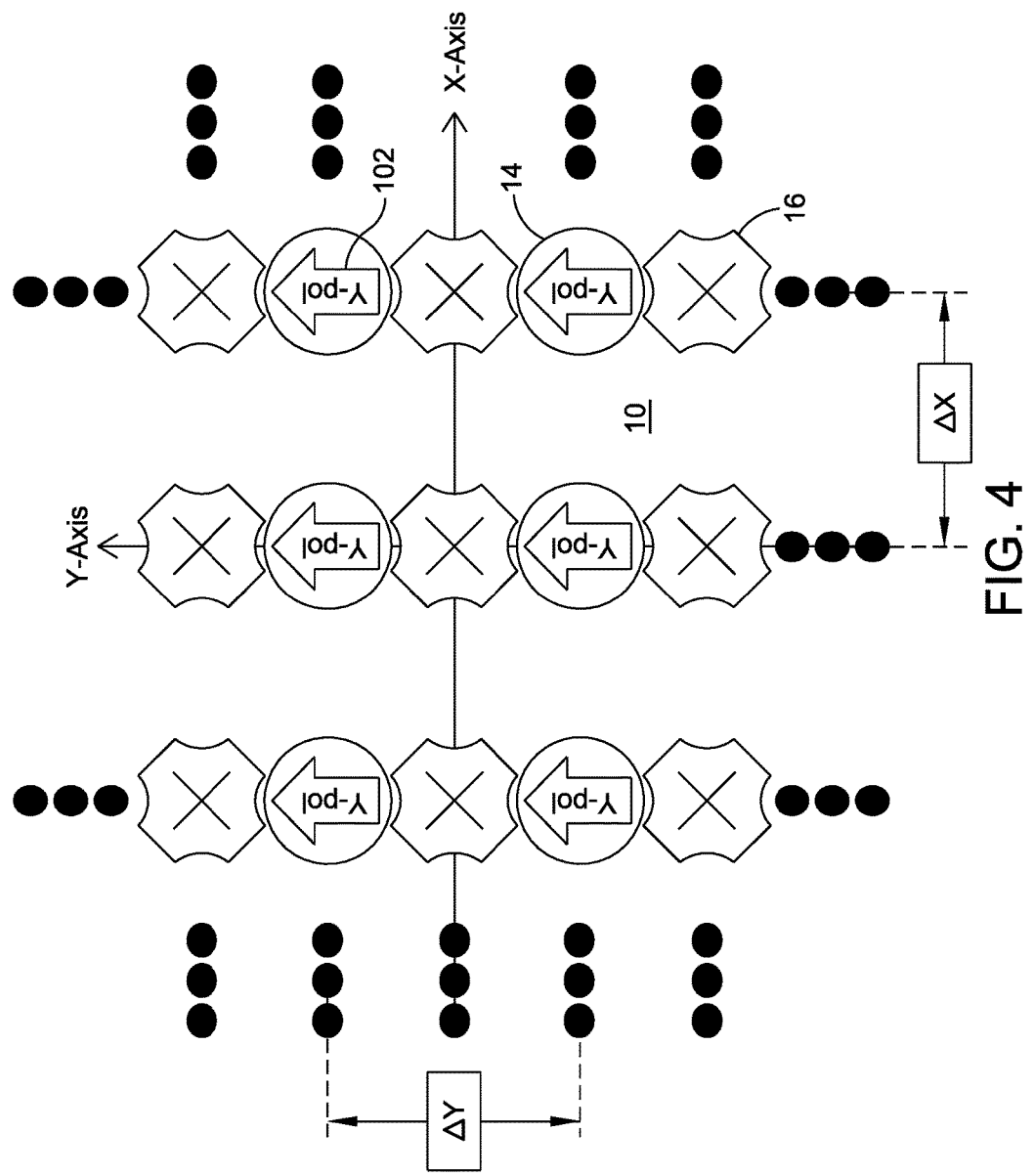
FIG. 4 depicts signal polarization components captured by the radio frequency ports that are aligned with the Y-axis and are digitally processed to resolve an instantaneous Y-component of each signal polarization.

FIG. 3 illustrates a set of the X-polarization radio frequency ports 12 that are aligned with the X-axis of the Eplane 10 and FIG. 4 illustrates a set of the Y-polarization radio frequency ports 14 that are aligned with the Y-axis of the Eplane.

Returning to FIG. 1, the Eplane 10 that is populated with a plurality of RF ports, may represent either a plurality of X-pol RF ports 12 as shown in FIG. 3 or a plurality of Y-pol RF ports 14 as shown in FIG. 4. The method steps of this detailed description of the invention, to a direction-of-arrival determination is the same for the set of X-pol RF ports 12 and for the set of Y-pol RF ports 14. Two processors are required to determine the direction-of-arrival and the instantaneous polarization of each signal in the field of view.

Figure 5:
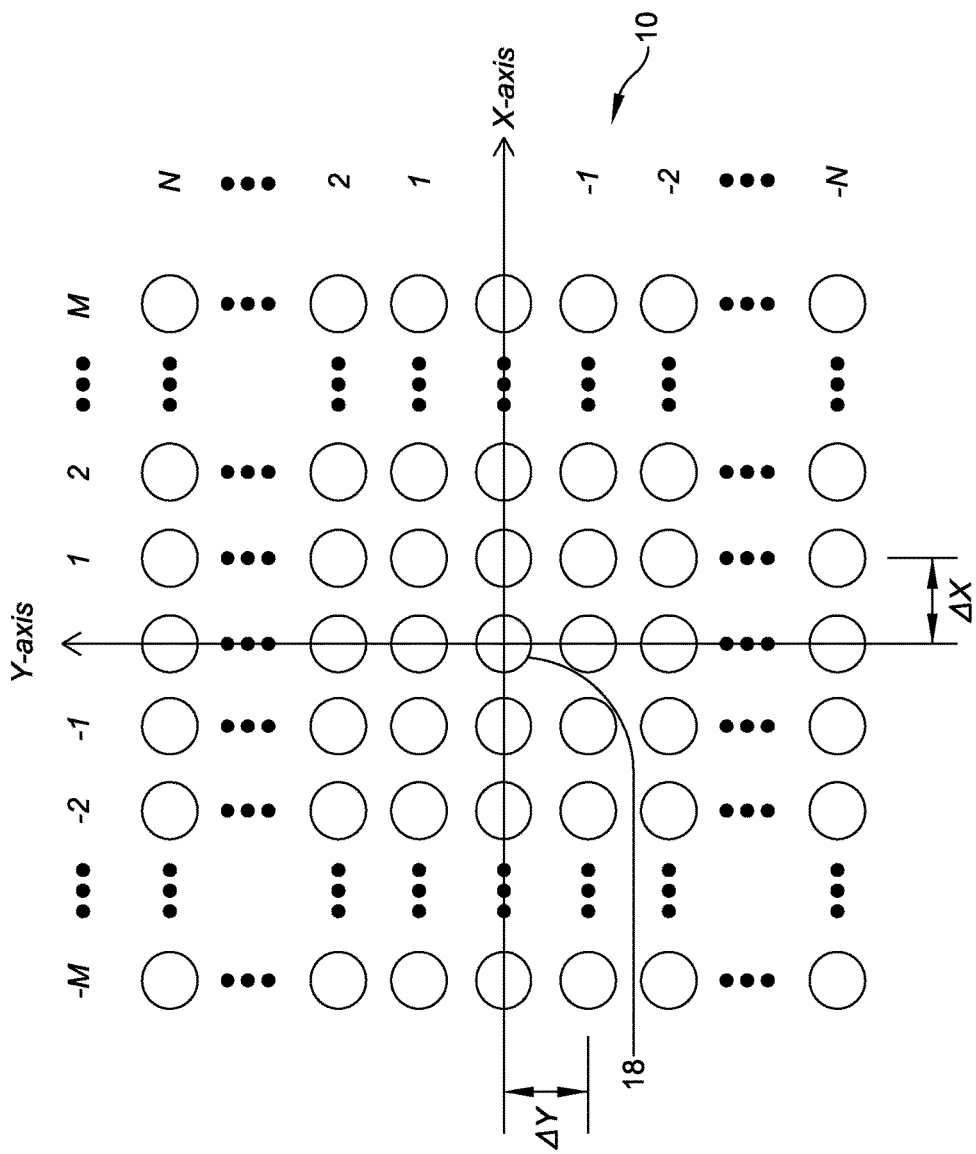
FIG. 5 depicts an arrangement of radio frequency ports and corresponding phase centers in a partitioned air interface array.

In FIG. 5, a planar field of the RF ports, each of which has a well-defined phase center is illustrated. A central radio frequency port 18 is chosen as an origin of an X-Y plane on which the location of each radio frequency port is defined. In order to simplify the method presented herein, an equally spaced port arrangement is assumed but a similar analysis may be used for any port spacing arrangement on a planar surface.

Figure 6:
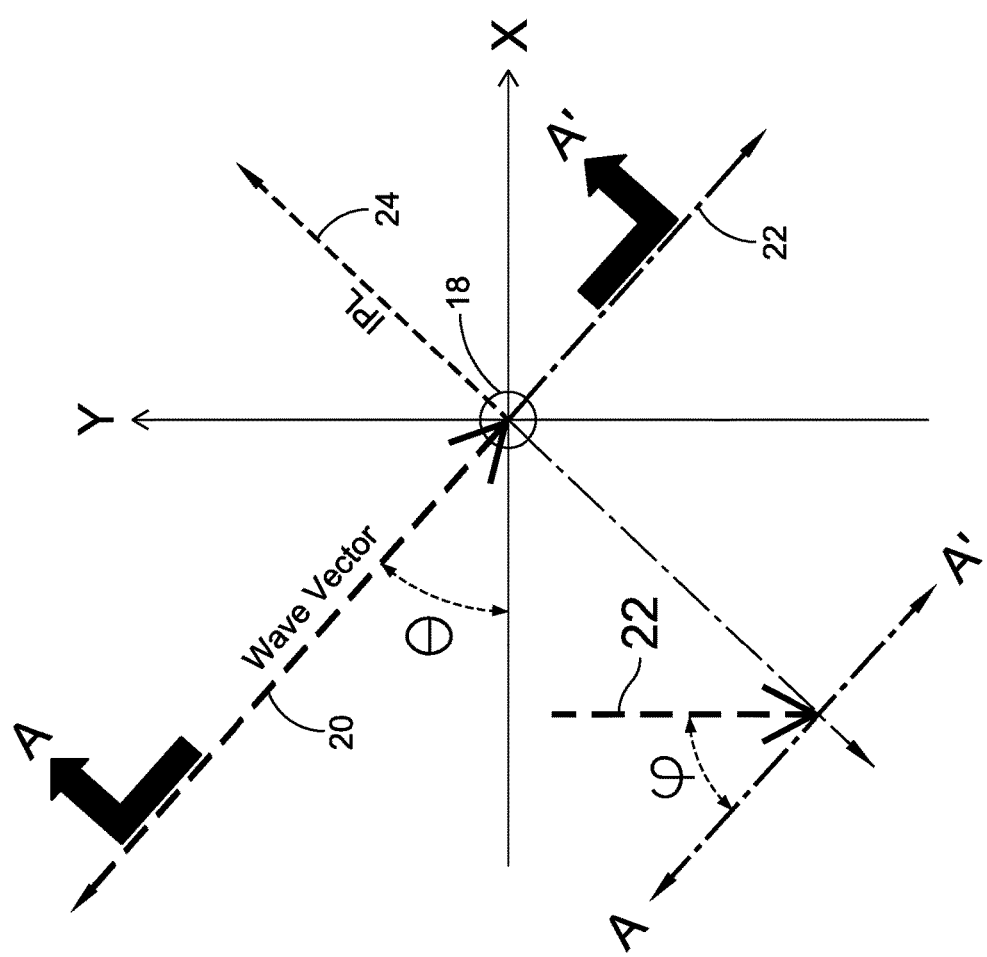
FIG. 6 is a schematic depicting a wave vector direction of arrival.

As shown in FIG. 6, the central port 18 defines the origins of the X-axis and the Y-axis. The central port 18 is a reference port for a phase difference associated with each radio frequency port 12, 14. For the purposes of this invention, a phase difference represents any temporal feature of a received signal that can be used to measure the time difference of arrival of any signal in the ensemble at two or more RF ports in the planar arrangement of RF ports. The time arrival of a complex waveform at two different radio frequency ports may be determined by a process known as "cross-correlation". For the purpose of the method described herein, the determined time difference of arrival is converted to a phase angle difference at a dominant frequency associated with the complex waveform.

Each RF port phase center is planar aligned with each other RF port phase center in the Eplane 10 as defined by the X-axis and the Y-axis. Since a phase center is defined by electronic properties and not physical properties, the condition that the RF port phase centers are planar aligned is a result of the construction symmetry. Also, because the physical location for each RF port 12 on the Eplane 10 is defined by X-axis and Y-axis coordinates M and N respectively, the associated radio frequency phase centers, RFPC may be identified by their coordinates, M and N as RFPC (M, N).

The method of the present invention is illustrated in FIG. 6 in which the direction of arrival of a wave vector 20 (as a signal) is specified by the angles, Theta (ω) and Phi (φ). The wave vector 20 contacts the Eplane 10 as defined by the coordinates on the X-axis and Y-axis at the central port 18. A wave vector representing a signal in the incident ensemble may be observed to arrive at the same angle of incidence at each and every RF port in the Eplane 10. The temporal features of each wave vector will arrive at each RF port at a time that is determined by the direction of arrival of the wave vector 20. A plane 22 that is normal to the Eplane 10 and including the wave vector 20 is formed to place the first angle, Theta (θ), which is measured increasing clockwise from the negative X axis. A view A-A' is created normal to a plane 22 to show that the wave vector 20 arrives at the second angle, Phi (φ) which is measured as the elevation above the A-A' view of the Eplane 10.

In the figure, an isophase locus 24 (IPL) is illustrated in which the phase is constant along this locus. The IPL 24 is normal to the plane 22 of the incident wave vector 20. The significance of the isophase locus 24 is that wave vectors arriving at radio frequency ports on the same isophase locus will arrive at the radio frequency port phase centers with the same relative phase ("phase" is used in the present context to represent any distinguishable temporal property of a wave vector that can be measured). Furthermore, any straight line locus on the Eplane 10 that is parallel to the isophase locus 24 will also be an isophase locus. Thus, the expected phase difference between any two RF ports on an Eplane 10 reduces to determining a perpendicular separation, Z, between the isophase loci intersecting two radio frequency ports (See FIG. 7).

The objective of the method is to establish a relationship between the variables Theta (θ), Phi (φ) and Z that can be solved when the time difference of arrival between the wave vector arriving at one radio frequency port and the wave vector and the wave vector from the same source arriving at the second radio frequency port. In the logic that follows, the time difference of arrival for an RF signal wave vector arriving at a first RF port and a second RF signal wave vector arriving at a second RF port is calculated. The geometry determines the difference in distance traveled by the two wave vectors and then computing the time difference of arrival by invoking the speed of light as the propagation velocity. The time difference of arrival is the same for all wave vector pairs arriving on any port pair such that the first port lies on a first isophase locus and a second port lies on a second isophase locus separated by the first isophase locus by a value of 'Z".

Figure 7:
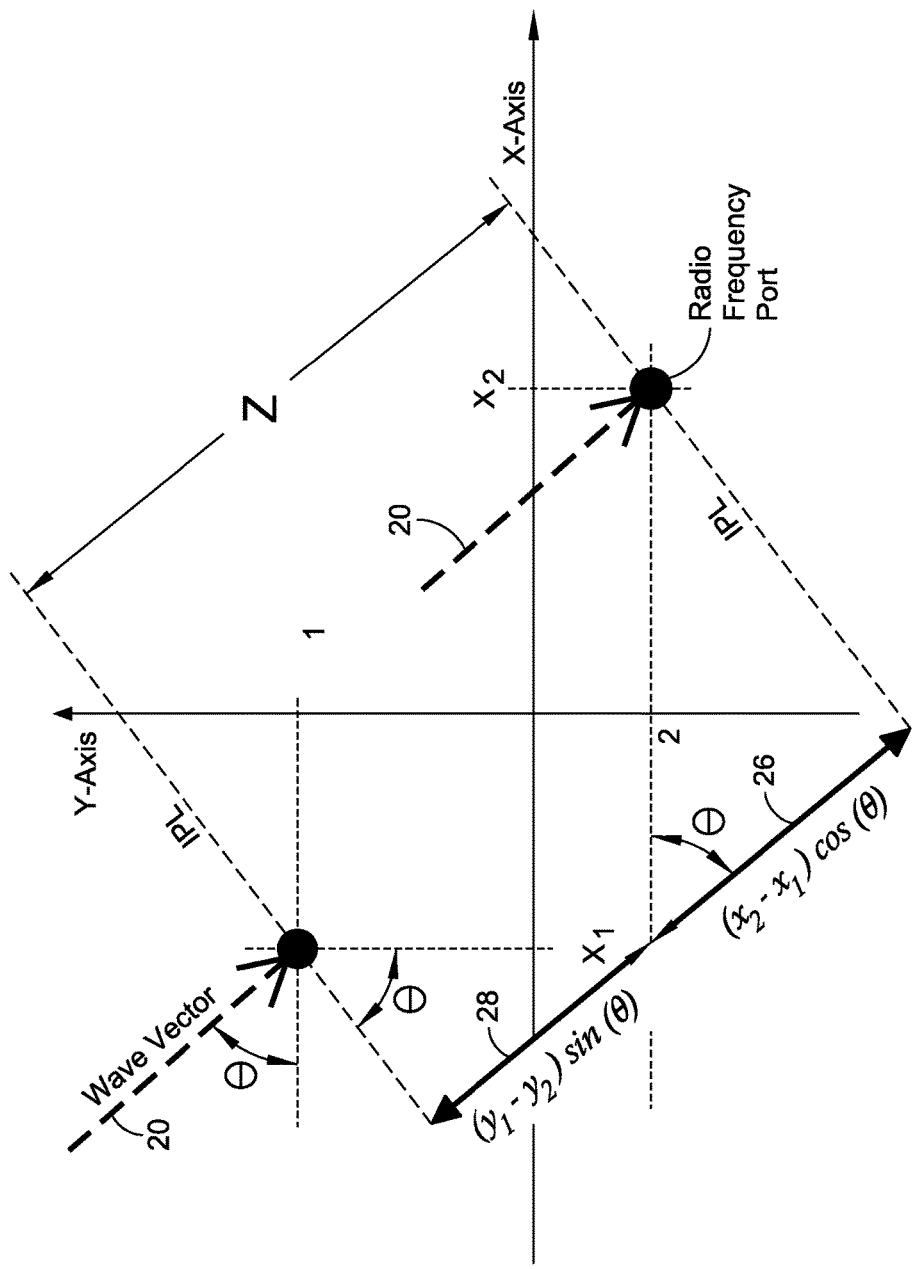
FIG. 7 is a schematic for computing a separation between two radio frequency ports.

FIG. 7 illustrates a geometry for computing the perpendicular separation, Z, between two isophase loci, passing through the phase centers of two radio frequency ports defined on the Eplane 10 by the coordinates $(X_1, Y_1)$ and $(X_2, Y_2)$. Completing the geometrical construction, it is apparent that the perpendicular separation is defined as the sum of two computable segments 26, 28 with measures that depend on the coordinates of the radio frequency ports and on the azimuthal angle, Theta (θ), of arrival of the wave vectors 20. The computable segments lead to the evaluation of time differences of arrival among the plurality of RF phase centers.

The geometric relationship defining the measure of the parameter Z is $$Z=(X_2-X_1)\cos(\theta)+(Y_2-Y_1)\sin(\theta) \quad [1]$$

Figure 8:
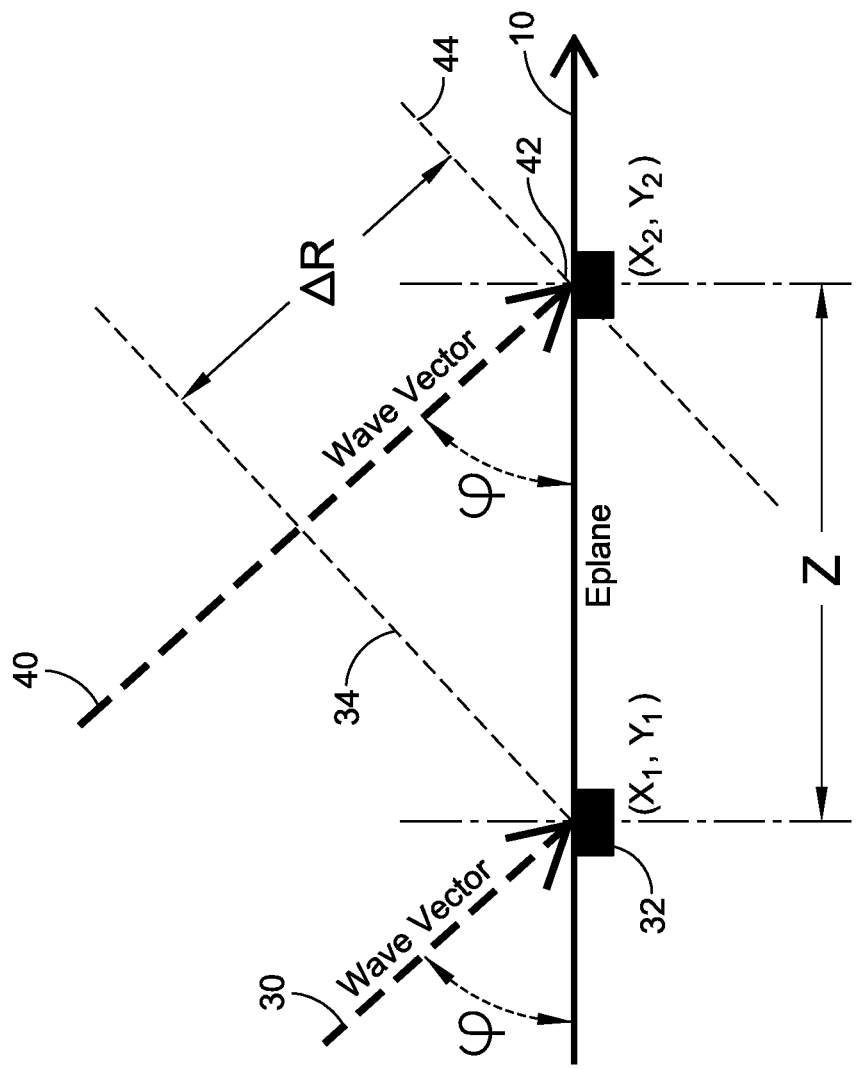
FIG. 8 depicts a schematic for determining an expected phase difference between a first wave vector arriving at a first radio frequency port phase center and a second wave vector arriving at a second radio frequency port phase center.

In FIG. 8, a graphical relationship is shown that determines an expected phase difference, or equivalent time delay, between a wave vector (radio signal) 30 arriving at a radio frequency port phase center 32 and a wave vector (radio signal) 40 arriving at a radio frequency port phase center 42, wherein each phase center is located on the Eplane 10. It is reasonable to assume that the radiating source creating the wave vectors 30, 40 is in the far field so that all wave vectors arriving at each RF port on the Eplane 10 will arrive with the same magnitude and at the same elevation angle, Phi φ.

In the present invention, "far field" is an antenna term and relates to the transition between complex fields near the antenna and the far region where propagation is uniform. This transition occurs at a distance roughly $2(D^2)/\text{lambda}$ from the antenna with approximately "D" being the largest dimension of the antenna. "D" is a linear dimension expressed in the same units as the wavelength. In the case of a parabolic reflector, "D" is approximately equal to the diameter of the reflector. With respect to the present invention, there is almost no instance in which the signal sources will not be in the far field. This means that the wave vectors arriving at each RF port will be identical to each other except for the time delay caused by the direction of arrival.

In the figure, the wave vector 40 arriving at the radio frequency port 42 at the coordinate $(X_2, Y_2)$ travels further by a distance ΔR than the wave vector 30 arriving at the RF port 32 at the coordinate $(X_1, Y_1)$ and therefore would be phase delayed by an angle Δσ such that $$\Delta\sigma = \left(\frac{2\pi}{\lambda}\right)\Delta R \quad [2]$$

When developing the direction-of-arrival of a signal, a pure sinusoid is used, having virtually no bandwidth. The sinusoid has instantaneous phase and the phase difference between two sinusoids of the same frequency may be represented as an angle, which is designated as Δσ herein and is defined at a single frequency and may be interpreted as a time delay. When computing Δσ for a complex waveform, cross-correlation is used which results in λ, a measure with dimensions in time. A single frequency is then used to represent this complex waveform and to convert the time measure λ into an angle measure Δσ which is mathematically equivalent and easier to compute. In summary, the incident waveforms are complex and may be spread over wide bandwidths while in processing. Each incident waveform is replaced with a pure sinusoid and each time difference of arrival is converted to an angle of phase representing an equivalent time delay.

The measure of ΔR is made clearer by lines 34, 44 that are normal to the wave vectors 30, 40 and pass through the wave vectors at the phase centers 32, 42 of the respective incident RF ports 12.

$$\Delta\sigma = \left(\frac{2\pi}{\lambda}\right)[(X_2 - X_1)\cos(\theta) - (Y_2 - Y_1)\sin(\theta)]\cos(\varphi) \quad (3)$$

Using Equations (2) and (3), ΔR is defined by comparison to Equation (2) and λ is the wavelength of the wave vectors 30, 40. As shown in the figure, the differential path length, ΔR, may be related to the separation parameter Z by the cosine of the elevation angle Phi φ as indicated in Equation (3). Equation (3) expresses the expected phase difference between any two radio frequency ports 12 arranged on an Eplane 10.

The phase difference, Δσ, incurred after the wave vector has traveled an additional distance ΔR, is a function of a mechanical measure defining the locations of the radio frequency ports 12, in which the relative locations of the ports are rigid for all incident wave vectors, and the angles, ω and φ that specify the direction of arrival of each wave vector.

It should be noted that Equation (3) represents any arrangement of two radio frequency ports located on a planar surface and is not confined to a rectangular port arrangement as depicted in FIG. 5. The arrangement in FIG. 5 represents the partitioned air interface as described in U.S. Pat. Nos. 6,466,167 and 7,250,920, incorporated herein by reference.

Restated, the present invention, which is based on the properties expressed by Equation (3), describes a method for determining the direction of arrival coordinates for a plurality of far-field RF sources that are generating wave vectors toward aperture segments of a specific Eplane 10. The phase-difference relationship expressed by Equation (3) is valid for any planar array of identical RF ports acting as receivers of wave vectors from far field sources. The phase difference, σ, is measured in radians provided that the X and Y coordinates of the radio frequency port phase centers are expressed in the same measure as the wavelength, λ, and provided that the angles, θ and φ, are expressed in radians.

Figure 9:
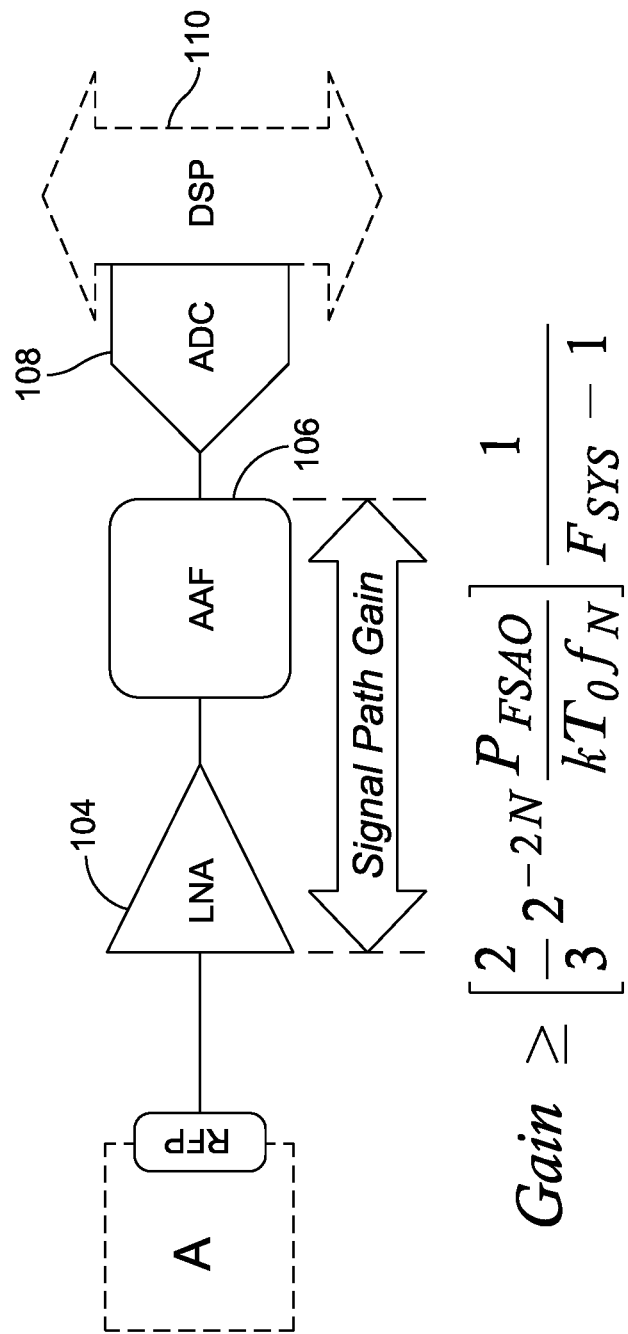
FIG. 9 depicts a signal path GAIN fundamental limit.

In addition, the method of the present invention requires that each radio frequency port phase center begins a signal path that leads to an analog-to-digital converter which digitizes the analog electromagnetic energy coupled to the radio frequency port phase center and generates a digital data stream representing the combined time-varying electromagnetic energy of the ensemble of wave vectors arriving at a radio frequency port. A minimal requirement for each signal path is illustrated in FIG. 9.

In the figure, each signal path begins at a typical RF port phase center, RFP, in which the port phase center is associated with an effective aperture, A. Electromagnetic energy from radiating sources arriving at the Eplane 10 within a field of view of the effective aperture is concentrated at the RFP and is gathered into a transmission line that is connected to the input port of a low-noise amplifier 104.

The low-noise amplifier 104 amplifies electromagnetic energy entering the signal path. The gain of the low-noise amplifier 104, minus the losses in an anti-aliasing filter 106, is determined by the properties of a signal path analog-to-digital converter 108 and a required system noise figure, $F_{SYS}$. The minimum signal path Gain is subject to a fundamental limit as defined by the parameters of the Gain equation of FIG. 9.

In the figure, the properties of the analog-to-digital converter 108 that influence the Gain are identified inside the square brackets with: N being the number of quantization bits in a quantizer of the analog-to-digital converter; $f_N$ being the Nyquist bandwidth of the analog-to-digital converter (defined as one-half the sample rate of the analog-to-digital converter); $P_{FSAO}$ being the sine wave power available from the output of a driving source with a signal amplitude that matches a full-scale signal dynamic range of the analog-to-digital quantizer at a frequency greater than ninety percent of the Nyquist frequency; k being Boltzmann's constant $1.38064852 \times 10^{-23}$ m$^2$ kg s$^{-2}$ K$^{-1}$; and $T_0$ being the Kelvin standard temperature, 290 degrees Celsius.

The overall gain of a signal path between the radio frequency port phase center and the input port of the analog-to-digital converter 108 is subject to a fundamental limit of the Gain. The Gain is determined by the properties of the analog-to-digital converter and the required system noise figure, $F_{SYS}$, which is specified at the input port of the low noise amplifier 104. This fundamental limit is derived as an optimization of the signal dynamic range of the signal path as determined by the minimum detectable signal power density in the presence of a quantization noise power density of the analog-to-digital converter 108 resulting from a maximum quantizable signal at a frequency which is greater than ninety percent of the Nyquist frequency.

Furthermore, each signal path is virtually identical to each other signal path so that statistical variations among the plurality of signal-path transfer functions are Gaussian distributed with a slowly time-varying mean and standard deviation.

The plurality of digital data streams entering a digital signal processor 110 is equal to the number of radio frequency ports in an affected Eplane. The digital signal processor 110 performs digital operations on the digital data streams to extract data about the incident radiation captured by the Eplane 10 for a plurality of radio frequency ports.

The illustration of a wave vector direction of arrival has been previously illustrated in FIG. 6 as requiring the determination of the angles, θ and φ, which describe an azimuthal coordinate and an elevation coordinate of the incident wave vectors 30, 40. Furthermore, a derived phase relation is described in Equation (3) that expresses the phase difference, Δσ, between the phase centers of any two radio frequency ports as a function of the trigonometric properties of the two angles of incidence, θ and φ, the physical coordinates of the selected radio frequency port phase centers, and the wavelength of the incident wave vectors 30, 40.

The relationship described in Equation (3) may be interpreted in at least two different ways. First, if the angles θ and φ are known, then the expected magnitude of the phase difference, Au, between any two radio frequency ports can be calculated.

Figure 10:
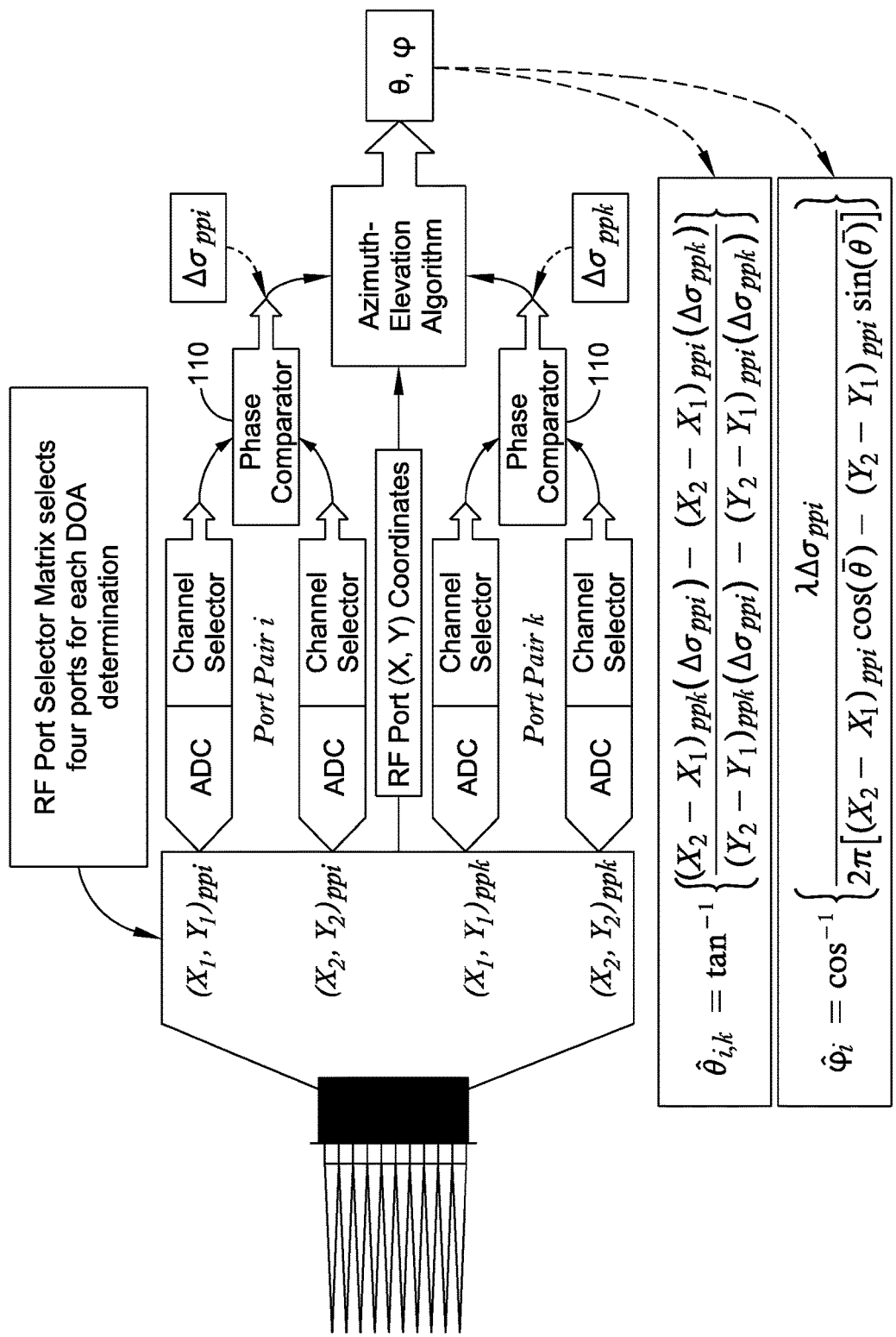
FIG. 10 depicts a radio frequency port selector matrix that selects four ports for each direction of arrival determination.

As shown in FIG. 10, second and most important for determining the direction of arrival, the angles θ and φ, are determined by the simultaneous solution of two phase difference measurements based on two independent pairs of radio frequency ports. For each far field emitter, a phase comparator 112 of the digital signal processor 106 is programmed to evaluate the phase difference between pairs of specific incident wave vectors 30, 40 that arrive at pairs of radio frequency ports. Only two pairs of radio frequency ports are necessary to obtain θ and φ values for one such far field emitter.

A 'port pair' is defined herein as two randomly selected radio frequency ports 12 as depicted in FIG. 7 and are identified in the present description by the script 'ppi' for the i$^{th}$ port pair and 'ppk' for the k$^{th}$ port pair. In this definition, 'ppi' and 'ppk' represent any two randomly selected port pair groups chosen for the evaluation of the direction of arrival for a wave vector. For the arrival of the wave vectors, one port pair is $(X_1,Y_1)_{ppi}$, $(X_2,Y_2)_{ppi}$ and the other port pair is $(X_1,Y_1)_{ppk}$, $(X_2,Y_2)_{ppk}$.

Referring now to Equation (3) as applied to FIG. 10, $\Delta\sigma_{ppi}$ represents the measured phase difference of the $i^{th}$ port pair and $\Delta\sigma_{ppk}$ represent the measured phase difference for the $k^{th}$ port pair. Furthermore, define the ratio of $\Delta\sigma_{ppi}$ to $\Delta\sigma_{ppk}$ as '$\rho_{i,k}$'.

$$\rho_{i,k} = \frac{\Delta\sigma_{ppi}}{\Delta\sigma_{ppk}} = \frac{[(X_{2i}-X_{1i})\cos(\theta)+(Y_{2i}-Y_{1i})\sin(\theta)]}{[(X_{2k}-X_{1k})\cos(\theta)+(Y_{2k}-Y_{1k})\sin(\theta)]} \quad (4)$$

Equation (4) may be rearranged to determine the azimuth angle, $\theta$, as illustrated in Equation (5).

$$\hat{\theta}_{i,k} = \tan^{-1}\left\{\frac{(X_2-X_1)_{ppk}(\rho_{i,k})-(X_2-X_1)_{ppi}}{(Y_2-Y_1)_{ppk}(\rho_{i,k})-(Y_2-Y_1)_{ppi}}\right\} \quad (5)$$

The hat over $\hat{\theta}_{i,k}$ indicates that each result is an estimate of the true value of theta and that multiple results will be necessary to establish a mean value for theta. Herein, the mean value thus obtained is designated by a bar over $\bar{\theta}$.

Estimates of $\bar{\theta}$ may be used to derive estimates for the elevation angle $\hat{\varphi}$ using Equation (4) with any of the randomly selected port pairs as illustrated in Equation (6).

$$\hat{\varphi}_i = \cos^{-1}\left\{\frac{\lambda\Delta\sigma_{ppi}}{2\pi[(X_2-X_1)_{ppi}\cos(\bar{\theta})-(Y_2-Y_1)_{ppi}\sin(\bar{\theta})]}\right\} \quad (6)$$

The hat over $\hat{\varphi}_i$, indicates that each result is an estimate of the true value of Phi ($\varphi$) and that multiple results will be necessary to establish a mean value for Phi ($\varphi$). Herein, the mean value thus obtained will be designated by a bar over $\bar{\varphi}$.

A statistical method for determining the direction of arrival by measuring the phase difference between pairs of radio frequency ports has been described although phase measurements for only two pairs of randomly chosen radio frequency ports are necessary to obtain a direction of arrival solution estimate. The solution estimate will be subject to statistical variations in the transfer function properties of selected signal paths. A mean direction of arrival solution may be obtained by averaging N solution estimates obtained by repeating the direction of arrival determination using other randomly selected port pairs.

The number, N, of solutions required to obtain a direction of arrival solution with predictable accuracy may be determined from the variance of the phase distribution measurements. Since the variance is a slowly time-varying property of the physical hardware, N will decrease as the history of direction of arrival determinations increases.

Once the direction of arrival of any signal has been determined with acceptable accuracy; the determined signal may become a signal-of-opportunity and can be used as an observable with a known relative time-of-arrival at each radio frequency port phase center in a designated array. Since every signal acquired by the subject array will be locked in time to the observable signal at the phase centers of the radio frequency ports, the direction of arrival of every signal acquired may be determined in the digital signal processing software without further resorting to the process used to obtain the direction of arrival of the observable. In this way, a signal of opportunity becomes an observable signal that can be used to determine the direction of arrival of other signals captured by a designated Eplane.

It will be understood that many additional changes in the details, materials, steps and arrangement of parts, which have been herein described and illustrated in order to explain the nature of the invention, may be made by those skilled in the art within the principle and scope of the invention as expressed in the appended claims.

The foregoing description of the preferred embodiments of the invention has been presented for purposes of illustration and description only. It is not intended to be exhaustive nor to limit the invention to the precise form disclosed; and obviously many modifications and variations are possible in light of the above teaching. Such modifications and variations that may be apparent to a person skilled in the art are intended to be included within the scope of this invention as defined by the accompanying claims.

What is claimed is:

1. A method for determining a direction of arrival for each radio signal of an ensemble of radio signals of opportunity with ultra-wideband width, said method comprising the steps of:
   providing a plane populated with an array of radio frequency ports such that each of the radio frequency ports is associated with a segmented aperture of the plane;
   receiving a first signal with a first pair and a second pair of the radio frequency ports;
   simultaneously receiving a second signal with the first pair of radio frequency ports and the second pair of the radio frequency ports;
   identifying the first pair of radio frequency ports and the second pair of radio frequency ports;
   providing rectangular coordinates of positions of radio frequency port phase centers of the plane of segmented apertures such that X coordinates are aligned with a horizontal direction and Y coordinates are aligned with a vertical direction wherein the first pair of radio frequency ports and the second pair of radio frequency ports relate to the radio frequency port phase centers and are uniformly spaced on the X coordinates and the Y coordinates of the plane; and
   identifying a radio signal arrival direction for the first signal and the second signal from the first pair of radio frequency ports and the second pair of radio frequency ports as specified by angles, theta $\theta$ and phi $\varphi$ wherein the angle theta is measured clockwise from a negative X axis of the plane and the angle phi is a measure of elevation from the X-Y plane.

2. The method in accordance with claim 1, said method further comprising the step of converting each radio signal of the ensemble of the plurality of radio signals to a digital signal with a number of digital signals equal to a number of the radio frequency port phase centers.

3. The method in accordance with claim 2, said method further comprising the step of determining a perpendicular separation between isophase loci intersecting two radio frequency port phase centers and recognizing a phase difference between the two radio frequency port phase centers for each of the first signal and the second signal based on a geometric relationship defining parameter Z in which for the first signal $Z_1=(X_2-X_1)\cos(\theta_1)+(Y_2-Y_1)\sin(\theta_1)$ and in which for the second signal $Z_2=(X_2-X_1)\cos(\theta_2)+(Y_2-Y_1)\sin(\theta_2)$ wherein $X_1$, $Y_1$ and $X_2$, $Y_2$ are respective coordinates of the radio frequency port phase centers on the plane and θ is the angle of arrival assigned to the first signal and the second signal.

4. A method for determining an arrival direction for each radio signal of an ensemble of a plurality of radio signals of opportunity with ultra-wideband width, said method comprising the steps of:

providing a plane populated with an array of radio frequency ports such that each of the radio frequency ports is associated with a segmented aperture of the plane;

receiving a first radio frequency signal of a first set of wave vectors with a first set and a second pair of the radio frequency ports;

simultaneously receiving a second signal of a second set of wave vectors with the first pair of radio frequency ports and the second pair of the radio frequency ports;

identifying the first set of radio frequency ports as a vertical set of radio frequency ports by a script 'ppi';

identifying a second set of radio frequency ports as a horizontal set of radio frequency ports by a script 'ppk';

identifying the first set of wave vectors as a first port pair $(X_1,Y_1)$, $(X_2,Y_2)$ and the second set of wave vectors as a second port pair $(X_1,Y_1)$, $(X_2,Y_2)$;

identifying a first angle theta $\theta_1$ for the first signal and a second angle theta $\theta_2$ for the second signal wherein the first angle theta and the second angle theta are measured clockwise from a negative X axis of the plane;

measuring a phase difference $\Delta\sigma_{ppi}$ of a $i^{th}$ port pair and $\Delta\sigma_{ppk}$ and a phase difference $\Delta\sigma_{ppk}$ for a $k^{th}$ port pair with the ratio of $\Delta\sigma_{ppi}$ to $\Delta\sigma_{ppi}$ as '$\rho_{i,k}$' by the equation $$\rho_{i,k} = \frac{\Delta\sigma_{ppi}}{\Delta\sigma_{ppk}} = \frac{[(X_{2i} - X_{1i})\cos(\theta_1) + (Y_{2i} - Y_{1i})\sin(\theta_1)]}{[(X_{2k} - X_{1k})\cos(\theta_1) + (Y_{2k} - Y_{1k})\sin(\theta_1)]};$$

measuring a phase difference $\Delta\sigma_{ppi}$ of a $i^{th}$ port pair and $\Delta\sigma$ ppk and a phase difference $\Delta\sigma_{ppi}$ for a $k^{th}$ port pair with the ratio of $\Delta\sigma_{ppi}$ to $\Delta\sigma_{ppi}$ as '$\rho_{i,k}$' by the equation $$\rho_{i,k} = \frac{\Delta\sigma_{ppi}}{\Delta\sigma_{ppk}} = \frac{[(X_{2i} - X_{1i})\cos(\theta_2) + (Y_{2i} - Y_{1i})\sin(\theta_2)]}{[(X_{2k} - X_{1k})\cos(\theta_2) + (Y_{2k} - Y_{1k})\sin(\theta_2)]};$$

determining an azimuth angle theta θ by the equation $$\hat{\theta}_{i,k} = \tan^{-1}\left\{\frac{(X_2 - X_1)_{ppk}(\rho_{i,k}) - (X_2 - X_1)_{ppi}}{(Y_2 - Y_1)_{ppk}(\rho_{i,k}) - (Y_2 - Y_1)_{ppi}}\right\}$$

with $\hat{\theta}_{i,k}$ as an estimate of a true value of theta θ;

identifying a first angle phi $\varphi_1$ for the first signal and a second angle phi $\varphi_2$ for the second signal wherein the first angle phi and the second angle phi are a measure of elevation from an X-Y axis of the plane;

determining an elevation angle by the equation $$\hat{\varphi}_l = \cos^{-1}\left\{\frac{\lambda\Delta\sigma_{ppi}}{2\pi[(X_2 - X_1)_{ppi}\cos(\overline{\theta_1}) - (Y_2 - Y_1)_{ppi}\sin(\overline{\theta_1})]}\right\}$$

with $\hat{\varphi}_l$ as an estimate of a true value of phi $\varphi_1$; and determining an elevation angle by the equation $$\hat{\varphi}_l = \cos^{-1}\left\{\frac{\lambda\Delta\sigma_{ppi}}{2\pi[(X_2 - X_1)_{ppi}\cos(\overline{\theta_2}) - (Y_2 - Y_1)_{ppi}\sin(\overline{\theta_2})]}\right\}$$

with $\hat{\varphi}_l$ as an estimate of a true value of phi $\varphi_2$.

* * * * *